United States Patent
Wang et al.

(10) Patent No.: US 8,775,829 B2
(45) Date of Patent: Jul. 8, 2014

(54) SINGLE PHASE LINE SWITCH

(75) Inventors: Xianfang Wang, Guangdong (CN);
Xiaoyong Dong, Guangdong (CN);
Linlin Pi, Guangdong (CN); Jianwei Liu, Guangdong (CN)

(73) Assignee: Shenzhen H & T Intelligent Control Co., Ltd., Shenzhen, Guangdong (CN)

(*) Notice: Subject to any disclaimer, the term of this patent is extended or adjusted under 35 U.S.C. 154(b) by 341 days.

(21) Appl. No.: 12/703,995

(22) Filed: Feb. 11, 2010

(65) Prior Publication Data
US 2011/0040988 A1  Feb. 17, 2011

(30) Foreign Application Priority Data

Aug. 14, 2009 (CN) .......................... 2009 1 0109410

(51) Int. Cl.
*G06F 1/00* (2006.01)

(52) U.S. Cl.
USPC ......................................................... 713/300

(58) Field of Classification Search
USPC ......................................................... 713/300
See application file for complete search history.

(56) References Cited

U.S. PATENT DOCUMENTS

2003/0160517 A1* 8/2003 Lo et al. .......................... 307/140
2009/0010671 A1* 1/2009 Hashimoto ....................... 399/88

OTHER PUBLICATIONS

Clamper, Jan. 10, 2009, Wikipadia, p. 1.*
Switchmode Power Supply Reference Manual, Sep. 1999, On Semiconductor, rev. 1.*

* cited by examiner

*Primary Examiner* — Thomas Lee
*Assistant Examiner* — Xuxing Chen
(74) *Attorney, Agent, or Firm* — Jackson IPG PLLC

(57) ABSTRACT

A single phase line switch having a phase line input connected to a phase line of the electric network and a phase line output connected to a negative line of the electric network via resistive loads or capacitive loads. The single phase line includes a first power supply unit connected between the phase line input and the phase line output, a second power supply unit, a controlled switch configured to control the second power unit to be on or off, and a micro control unit (MCU) configured to control the controlled switch to be switched on or off. The first power supply unit is configured to provide a power supply to the MCU when the controlled switch is off. The second power unit is configured to provide a power supply to the MCU and the controlled switch when the controlled switch is on, the second power supply unit being serially connected with the controlled switch, the second power supply and the controlled switch being parallel connected with the first power supply unit. The first power supply unit and the second power supply unit each comprises a voltage output terminal connected to a power supply end of the MCU.

9 Claims, 2 Drawing Sheets

SINGLE PHASE LINE SWITCH

BACKGROUND OF THE INVENTION

1. Field of the Invention

The present invention relates to electrical devices, and more particularly to a single phase line switch.

2. Description of the Related Art

Generally, traditional mechanic switches can control the electrical device to be turned on or off through one power line, which is usually the phase line. However, these mechanic switches are not applicable to situations that remote control is necessary or the mechanic switch can't be used. In this case, the traditional mechanic switches are replaced by active switches, such that the neutral line are needed, which would cause the quantities of wiring increased and rewiring may also needed. Therefore, the active switches have a very limited applicable scope.

What is needed, therefore, is a single phase line switch that can overcome the above-described deficiencies.

SUMMARY OF THE INVENTION

It is another object of the present invention to provide a single phase line switch to overcome the aforementioned disadvantages.

One exemplary embodiment of the present invention is a single phase line switch having a phase line input connected to a phase line of the electric network and a phase line output connected to a negative line of the electric network via resistive loads or capacitive loads. The single phase line includes a first power supply unit connected between the phase line input and the phase line output, a second power supply unit, a controlled switch configured to control the second power unit to be on or off, and a micro control unit (MCU) configured to control the controlled switch to be switched on or off. The first power supply unit is configured to provide a power supply to the MCU when the controlled switch is off. The second power unit is configured to provide a power supply to the MCU and the controlled switch when the controlled switch is on, the second power supply unit being serially connected with the controlled switch, the second power supply and the controlled switch being parallel connected with the first power supply unit. The first power supply unit and the second power supply unit each comprises a voltage output terminal connected to a power supply end of the MCU.

Other novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF THE PREFERRED EMBODIMENTS

Reference will now be made to the drawings to describe preferred and exemplary embodiments in detail.

Figure 1:
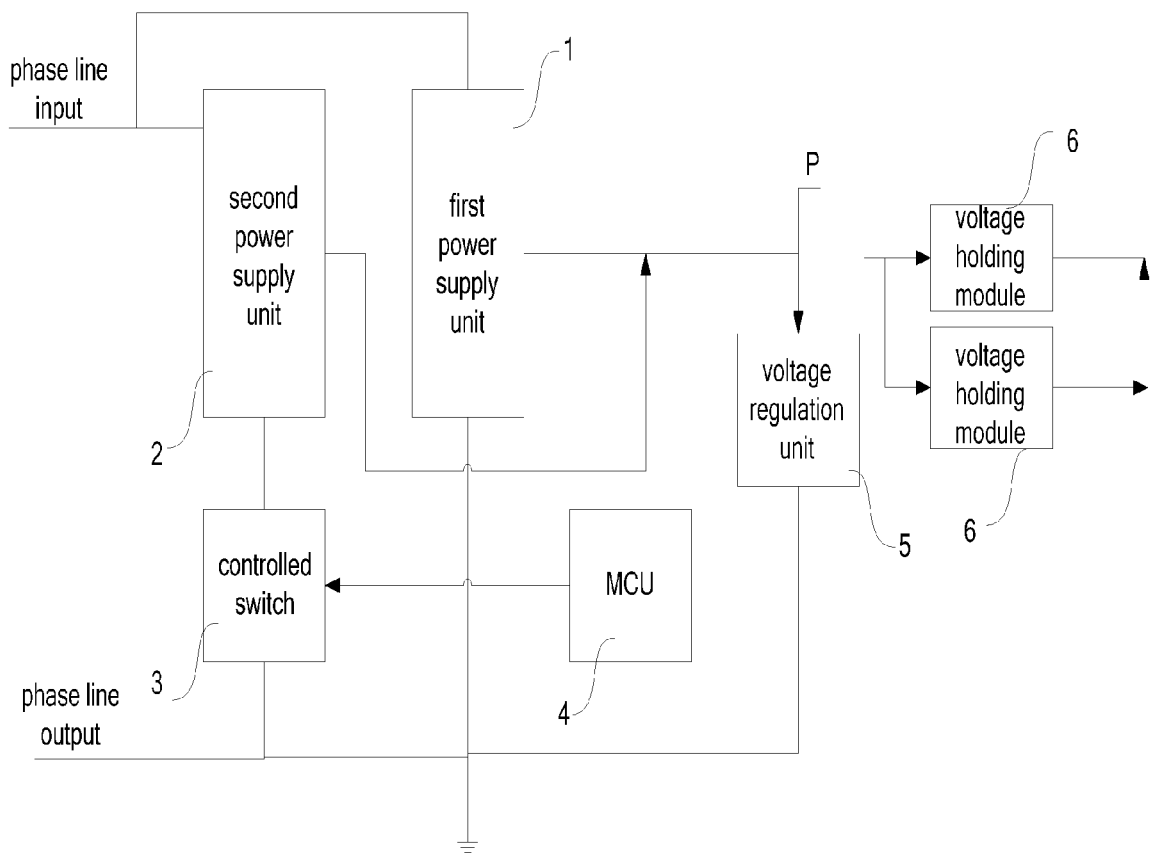
FIG. 1 is a block diagram of a single phase line switch according to an exemplary embodiment of the present invention.

Referring to FIG. 1, a block diagram of a single phase line switch according to an exemplary embodiment of the present invention is shown. The single phase line switch has a phase line input connected to the phase line of the electric network, and a phase line output connected to the neutral line of the electric network. The single phase line switch includes a first power supply unit 1, a second power supply unit 2, a controlled switch 3 configured to control the second power supply unit 2 to be turned on or off, a power supply end (namely a node P shown in FIG. 1), and a micro control unit (MCU) 4 configured to control the controlled switch 3 to be switched on or off. The first power supply unit 1 is configured to provide a power supply to the MCU 4 when the controlled switch 3 is off and the first power supply unit 1 is connected between the phase line input and the phase line output, and has a voltage output terminal connected the power supply end (node P), through which the MCU 4 has power supplied thereto. The second power supply unit 2 is configured to provide a power supply to the MCU 4 and the controlled switch 3 when the controlled switch 3 is on, and the second power supply unit 2 is serially connected with the controlled switch 3 which together constitute a serial branch, the serial branch being parallel connected with the first power supply unit 1. The second power supply unit 2 has a voltage output terminal connected to the power supply end (node P). In addition, the single phase line switch further includes voltage regulation unit 5 connected between the power supply end and the phase line output, and a plurality of power supply branches connected between the power supply end and different loads, the power supply branches each having a voltage holding module 6. The voltage regulation unit 5 is configured to regulating a voltage of the power supply end. As shown in FIG. 1, when the controlled switch 3 is at off-state, the electric network has a voltage applied to neutral line of the electric network through the phase line output of the first power supply unit 1 and the load. Because of a leakage current of the resistive and capacitive loads, the first power supply unit 1 has a certain voltage thereof and provides the voltage to the MCU 4 and the controlled switch 3 via the node P. In the circumstances, the current is relatively low and is not capable of operating the resistive loads or the capacitive loads but capable of operating the MCU 4 and the controlled switch 3. When the MCU 4 outputs a control signal to switch on the controlled switch 3, the voltage from the electric network is applied to the resistive loads or the capacitive loads via the second power supply unit 2 and the on-state controlled switch 3, a majority of the voltage-drop is applied to the resistive load or the capacitive load, while a minority of the voltage-drop is applied to the second power supply unit 2 to make the second power supply unit 2 obtains the certain voltage and provides power supply to the MCU 4 and the controlled switch 3. The voltage regulation unit 5 and the voltage holding module 6 are provided to further confirm a stability and precision of the power voltage.

In the illustrated embodiment, the controlled switch 3 is an impulse relay, whose switch ends respectively connected to the second power supply unit 2 and the phase line output, and winding provided with driving signals from the MCU 4.

Figure 2:
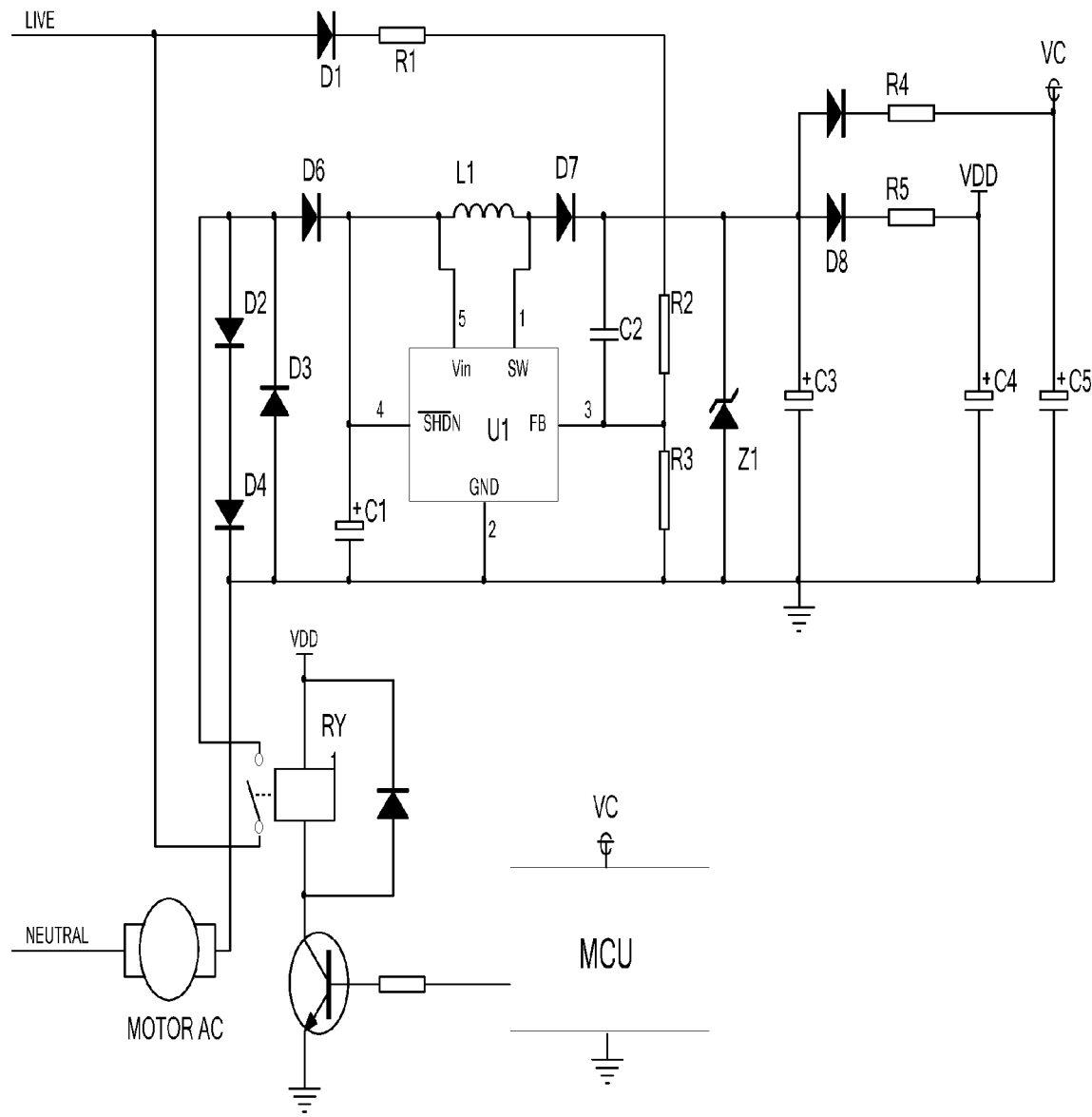
FIG. 2 is a circuit diagram of the single phase line shown in FIG. 1.

Referring to FIG. 2, a circuit diagram of the single phase line switch in FIG. 1 is shown. The first power supply unit 1 includes a first diode D1, a first resistor R1, a second resistor R2, and a third resistor R3. The diode D1 has a positive electrode connected to the phase line input, and a negative electrode connected to one end of the first resistor R1. The other end of the first resistor R1 is connected to one end of the second resistor R2. The other end of the second resistor R2 is connected to the phase line output via the third resistor R3.

The node P is at a connection point of the first resistor R1 and the second resistor R2. The second power supply unit 2 includes a voltage obtaining module and a boosting module. The voltage obtaining module is parallel connected with the boosting module. The voltage output terminal of the second power supply unit 2 is connected to node P. The voltage obtaining module includes a second diode D2, a third diode D3, and a fourth diode D4. The second diode D2 has a positive electrode connected to the phase line input, and a negative electrode connected to a positive electrode of the fourth diode D4. A negative electrode of the fourth diode D4 is connected to the phase line output. The third diode D3 has a negative electrode connected to the positive electrode of the second diode D2, and a positive electrode connected to the phase line output. The boosting module includes a direct current (DC) boosting integrated circuit U1 connected to the phase line input. The DC boosting integrated circuit U1 receives a DC voltage from the voltage obtaining module and boosts the DC voltage to the power source end (node P). A sixth diode D6 is provided between the DC boosting integrated circuit U1 and the phase line input, and the sixth diode D6 is a schottky diode. The sixth diode D6 has a positive electrode connected to the phase line input, and a negative electrode connected to a voltage input terminal of the DC boosting integrated circuit U1 (the voltage outputted from the voltage obtaining module is applied to the voltage input terminal of the DC boosting integrated circuit U1 via the sixth diode D6). As shown in FIG. 2, the DC boosting integrated circuit U1 has a fifth pin PIN5 connected to the negative electrode of the sixth diode D6, and further connected to the sixth pin PIN6 of the DC boosting integrated circuit U1 via an inductor L1. The sixth pin of the DC boosting integrated circuit U1 further is connected to a positive electrode of a seventh diode D7. A negative electrode of the seventh diode D7 is connected to the power supply end (node P). The DC boosting integrated circuit U1 also has a third pin PIN3 connected to the connection point of the second resistor R2 and the third resistor R3, a second pin PIN2 connected to phase line output (namely a common end of the single phase line switch, also called the ground), and a fourth pin PIN4 connected to the negative electrode of the sixth diode D6 and a positive electrode of a capacitor C1. The capacitor C1 has a negative electrode connected to ground.

In the illustrated embodiment, the voltage regulation unit 5 includes a voltage stabilizing diode Z1 and a capacitor C3 parallel connected to each other. A negative electrode of the voltage stabilizing diode Z1 and a positive electrode of the capacitor C3 are connected to the power supply end (node P), and a positive electrode of the voltage stabilizing diode Z1 and a negative electrode of the capacitor C3 are connected to ground. The voltage holding modules 6 are serially connected to each power supply branch respectively. Each voltage holding module 6 includes a diode. The diode has a positive electrode connecting the power supply end and a negative electrode connecting the power terminal of the power supply branch via a resistor, and a capacitor is also provided between the resistor and the phase line input.

In the illustrated embodiment, the single phase line switch has a working process described as follows. When the pulse relay RY1 is disconnected, a current is flowed from live line to neutral line sequentially via the first diode D1, the first resistor R1, and the voltage stabilizing diode Z1, and a motor, thereby forming a return circuit. The first resistor has a resistance great enough that the current in the return circuit is limited between a scope of 5-10 mA and the motor is not operated under such a low current. Herein the motor can also be some other load in alternative embodiments. At the same time, the current is also applied to the MCU 4, pulse relay RY1 and other electronic components.

When the pulse relay RY1 is connected, a current is flowed from the live line to the neutral line sequentially via the second diode D2, the fourth diode D4 and the motor during a positive cycle and sequentially via the third diode D3 and the motor during a negative cycle. The second diode D2 and the fourth diode D4 have only a 1.4V forward voltage drop, and the third diode D3 has only a 0.7 forward voltage drop. Thus, the motor has a voltage applied great enough to make the motor operate normally. The second diode D2 has a 1.4V voltage drop at the positive electrode connected to the sixth diode D6, and further connected to the fourth pin PIN4 of the DC boosting integrated circuit U1. Because the sixth diode D6 is a schottky diode, and has a forward voltage drop at about 0.1-0.2V, the fourth pin PIN4 of the DC boosting integrated circuit U1 is connected to the smoothing capacitor C1 which is connected to ground in order to smooth a voltage of the fourth pin PIN4. The fourth pin PIN4 has a requirement for a voltage applied thereto that the voltage is about 1.2V. The voltage output is determined by a divided voltage of the second resistor R2, the third resistor R3, which are served as voltage feedback resistors of the third pin PIN3 the DC boosting integrated circuit U1, and the output current is proportional to an inductance of the inductor L1. In the illustrated embodiment, a voltage output is 5V and a current output is 10 mA. The capacitor C3 is parallel connected with the voltage stabilizing diode Z1, which makes the 5V voltage output smoother. Because a relatively great current is necessary when the pulse relay RY1 is connected, in order not to drag down the voltage output when the pulse relay RY1 is connected, a diode D8, a resistor R5 and a capacitor C4 are serially connected constituting a serial branch that is parallel connected with the capacitor C3, and another diode, a resistor R4, and a capacitor C5 are serially connected constituting a serial branch that is parallel connected with the capacitor C3. VDD is connected to between the resistor R5 and the capacitor C4, and VCC is connected to between the resistor R4 and the capacitor C5. The VDD provides power supply to the pulse relay RY1, and the VCC provides power supply to the MCU 4 and other electronic component. The diode D8 and the resistor R5 are used to ensure a normal power supply when the relay is connected. In alternative embodiments, the second diode D2, the third diode D3, and the fourth diode D4 are serially connected with the pulse relay RY1 and then connected to between the phase line input and phase line output, that is connected with the power supply return circuit. Thus, a maximum current of a load is determined by the electronic components of the voltage obtaining module and the controlled switch. Through changing the working current of the second diode D2, the third diode D3, the fourth diode D4, the single phase line switch suitable for loads needing greater current.

It is to be understood, however, that even though numerous characteristics and advantages of exemplary and preferred embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A single phase line switch having a phase line input connected to a phase line of an electric network and a phase line output connected to a negative line of the electric network via resistive loads or capacitive loads, the single phase line switch comprising:

a first power supply unit comprising a first diode, a first resistor, a second resistor and a third resistor, a positive electrode of the first diode being connected to the phase line input, a negative electrode of the first diode being connected to one end of the first resistor, the other end of the first resistor being connected to one end of the second resistor and defining a power supply end, and the other end of the second resistor being connected to the phase line output via the third resistor;

a second power supply unit, wherein the first power supply unit and the second power supply unit each comprise a common voltage output terminal corresponding to the power supply end and wherein the second power supply unit comprises a voltage obtaining module and a direct current boosting module together controllably and parallel connected between the phase line input or the power supply end and the phase line output via a controlled switch;

wherein the controlled switch is configured to control the second power supply unit to be on or off and comprises a direct current relay having a switch end connected between the phase line input and the second power supply unit;

a micro control unit (MCU) configured to control the controlled switch to be switched on or off by providing driving signals to windings of the controlled switch;

a voltage regulation unit connected between the power supply end and the phase line output, wherein the voltage regulation is configured to regulate a voltage of the power supply end, and a plurality of voltage holding modules;

wherein the first power supply unit is configured to provide a power supply to the MCU when the controlled switch is off, wherein the second power supply unit is configured to provide a power supply to the MCU and the controlled switch when the controlled switch is on, the second power supply unit being serially connected with the controlled switch, the second power supply unit and the controlled switch being parallel connected with the first power supply unit, and wherein the power supply end is connected as an input of the plurality of voltage holding modules.

2. The single phase line switch as claimed in claim 1, wherein the voltage obtaining module comprises a second diode, a third diode and a fourth diode, a positive electrode of the second diode being connected to the phase line input, a negative electrode of the second diode being connected to a positive electrode of the fourth diode, a negative electrode of the fourth diode being connected to the phase line output, a negative electrode of the third diode being connected to the positive electrode of the second diode, and a positive electrode of the third diode being connected to the phase line output.

3. The single phase line switch as claimed in claim 1, wherein the boosting module comprises a direct current (DC) boosting integrated circuit U1 connected to the phase line input, a sixth diode being provided between the DC boosting integrated circuit U1 and the phase line input, the sixth diode having a positive electrode connected to the phase line input, and a negative electrode connected to a voltage input terminal of the DC boosting integrated circuit.

4. The single phase line switch as claimed in claim 3, wherein the voltage obtaining module is serially connected to the controlled switch, the voltage obtaining module and the controlled switch being connected between the phase line input and the phase line output, wherein a maximum load current being determined by the voltage obtaining module and the controlled switch.

5. The single phase line switch as claimed in claim 4, the voltage regulation module comprising a voltage stabilizing diode and a filtering capacitor parallel connected to each other.

6. The single phase line switch as claimed in claim 1, further comprising a plurality of power supply branches each connected between the power supply end and different loads respectively.

7. The single phase line switch as claimed in claim 6, wherein each power supply branch comprises a voltage holding module, the voltage holding module comprising a diode having a positive electrode connected to a power supply output terminal, and a negative electrode via a resistor connected to a power terminal of the load.

8. The single phase line switch as claimed in claim 7, wherein a capacitor is further provided between the end of the resistor that is connected to the load and the phase line output.

9. The single phase line switch as claimed in claim 1, wherein the voltage regulation module comprises a voltage stabilizing diode and a filtering capacitor parallel connected to each other.

* * * * *